United States Patent
Wang et al.

(10) Patent No.: US 12,503,659 B2
(45) Date of Patent: Dec. 23, 2025

(54) CHEMICAL LOOPING GASIFICATION METHOD FOR IRON-RICH SLUDGE

(71) Applicant: Shandong University of Science and Technology, Qingdao (CN)

(72) Inventors: Cuiping Wang, Qingdao (CN); Kun Wang, Qingdao (CN); Weiwei Cui, Qingdao (CN); Sheng Yao, Qingdao (CN); Jie Li, Qingdao (CN); Xiaoying Yuan, Qingdao (CN); Guozhang Chang, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 0 days.

(21) Appl. No.: 19/176,118

(22) Filed: Apr. 10, 2025

(65) Prior Publication Data
US 2025/0333659 A1 Oct. 30, 2025

(30) Foreign Application Priority Data
Apr. 10, 2024 (CN) .......................... 202410427599.0

(51) Int. Cl.
*C10J 3/54* (2006.01)
*C02F 11/122* (2019.01)

(52) U.S. Cl.
CPC ............. *C10J 3/54* (2013.01); *C02F 11/122* (2013.01); *C10J 2300/0946* (2013.01)

(58) Field of Classification Search
CPC ............. C10J 3/54; C10J 3/00; C02F 11/122
See application file for complete search history.

(56) References Cited

FOREIGN PATENT DOCUMENTS

| | | | |
|---|---|---|---|
| CN | 111777035 A | * 10/2020 | ............ C01B 3/06 |
| CN | 112063431 A | 12/2020 | |
| CN | 114275736 A | 4/2022 | |
| WO | 2011095847 A2 | 8/2011 | |

OTHER PUBLICATIONS

Kun Wang et al., "Red mud-based perovskite oxygen carrier preparation for chemical looping gasification of municipal sludge", Waste Management, No. 177, Feb. 7, 2024, pp. 169-176.

Yang Li et al., "Co-Utilization of Two Solid Wastes for Syngas Production by Chemical Looping Gasification", Journal of Combustion Science and Technology, vol. 27, No. 1, Feb. 15, 2021, pp. 7-15.

* cited by examiner

*Primary Examiner* — Sharon Pregler

(57) ABSTRACT

A chemical looping gasification method for iron-rich sludge is provided, in which the iron-rich sludge is sequentially subjected to pressure filtration and crushing to obtain an iron-rich sludge particle with a moisture content of 40-50%. The iron-rich sludge particle and an iron-based oxygen carrier are subjected to a chemical looping gasification reaction in a fluidized bed reactor to form a sludge ash as a supplementary oxygen carrier. The chemical looping gasification is then performed with the supplementary oxygen carrier, the oxygen carrier and unreacted iron-rich sludge particle, while the iron-rich sludge gasification process, the produced syngas is rich in hydrogen and could be used as fuel.

9 Claims, 13 Drawing Sheets

---

Subjecting an iron-rich sludge sample to pressure filtration and crushing to produce an iron-rich sludge particle with a moisture content of 40-50% — S101

Performing a chemical looping gasification reaction with an iron-based oxygen carrier and the iron-rich sludge particle in a fluidized bed reactor to obtain a sludge ash as a supplemental oxygen carrier — S102

Performing the chemical looping gasification reaction with the supplemental oxygen carrier, the iron-based oxygen carrier and unreacted iron-rich sludge particle — S103

CHEMICAL LOOPING GASIFICATION METHOD FOR IRON-RICH SLUDGE

CROSS-REFERENCE TO RELATED APPLICATIONS

This application claims the benefit of priority from Chinese Patent Application No. 202410427599.0, filed on Apr. 10, 2024. The content of the aforementioned application, including any intervening amendments made thereto, is incorporated herein by reference in its entirety.

TECHNICAL FIELD

This application relates to resource utilization of municipal solid waste, and more particularly to a chemical looping gasification method for iron-rich sludge.

BACKGROUND

Chemical looping technology is a promising carbon dioxide capture technology aimed at reducing the carbon dioxide emissions from the carbon-containing fuels utilization. Specifically, the carbon dioxide is captured and converted into valuable chemicals or fuels through chemical reactions, thereby reducing the reliance on fossil fuels and mitigating the greenhouse gas emissions.

In chemical looping technology, various oxygen carriers or catalysts are typically employed to facilitate the capture and conversion of carbon dioxide. These carriers or catalysts can absorb and release oxygen during chemical reactions, thereby enabling the capture and utilization of carbon dioxide. The chemical looping technology applied to the sludge treatment is mainly chemical looping gasification, by which the organic matter in the sludge is converted into syngas or other combustible gases, thus achieving recovery and utilization of energy sources. However, due to the exposure to mechanical, thermal and chemical stresses, oxygen carriers often suffer from significant performance degradation issues, such as attrition and elutriation, phase separation, agglomeration and sintering, thereby significantly hindering the large-scale commercial application of chemical looping technology.

SUMMARY

An object of the present disclosure is to provide a chemical looping gasification method for iron-rich sludge, which can at least address the problem of excessive performance degradation of oxygen carriers during the existing chemical looping gasification process of sludge.

Technical solutions of the present disclosure are described as follows.

A chemical looping gasification method for iron-rich sludge, comprising:
  subjecting a to-be-processed iron-rich sludge sample to pressure filtration and crushing to produce a first iron-rich sludge particle with a moisture content of 40-50% and a diameter of 0.5-1 mm;
  performing a chemical looping gasification with an iron-based oxygen carrier and the first iron-rich sludge particle in a fluidized bed reactor to obtain a sludge ash as a supplemental oxygen carrier;
  performing the chemical looping gasification with the supplemental ash oxygen carrier, the iron-based oxygen carrier and unreacted first iron-rich sludge particle; and
  switching an intake atmosphere of the fluidized bed reactor to air, subjecting the sludge ash to crushing, floatation and discharging, and regenerating the iron-based oxygen carrier and the supplemental oxygen carrier to complete one cycle of chemical looping gasification.

In some embodiments, the first iron-rich sludge particle has a diameter of 0.5-1 mm.

In some embodiments, the iron-based oxygen carrier is selected from the group consisting of a copper-iron spinel oxygen carrier, a perovskite-type oxygen carrier, a sludge-ash oxygen carrier and a combination thereof.

In some embodiments, a chemical formula of the copper-iron spinel oxygen carrier is $CuFe_2O_4$, and a chemical formula of the perovskite-type oxygen carrier is $CaMn_{0.5}Fe_{0.5}O_{3-\delta}$, where $\delta$ represents the moles of oxygen released by the oxygen carrier during the sludge gasification process, and $0<\delta<3$, and the oxygen carrier could be revived by obtaining the $\delta$ mole oxygen atom through oxidization in the air.

In some embodiments, the copper-iron spinel oxygen carrier is prepared through steps of:
  subjecting red mud to crushing, drying and sieving to obtain a red mud powder; wherein a particle size of the red mud powder is less than 75 μm, and the drying is performed at 105° C. for 4 h;
  mixing the red mud powder, copper oxide and mist spray to form a mixture; wherein the mixture has a moisture content of 10-15%, and a weight ratio of the red mud powder to the copper oxide is 17:3; and
  subjecting the mixture to pelletization, air-drying and oven-calcination to obtain the copper-iron spinel oxygen carrier.

In some embodiments, the step of subjecting the mixture to pelletization, air-drying and oven-calcination to obtain the copper-iron spinel oxygen carrier comprises:
  pelletizing the mixture to form a pellet blank with a particle size of 0.5-1 mm;
  air-drying the pellet blank at 20-30° C. for 24-48 h to obtain an air-dried pellet blank; and
  oven-calcining the air-dried pellet blank through a predetermined drying program to obtain the copper-iron spinel oxygen carrier;
  wherein the predetermined drying program is performed through steps of:
  heating an oven at a heating rate of 5° C./min to 350° C. and holding the oven at 350° C. for 2 h; and
  heating the oven at a heating rate of 5° C./min to 900° C., and holding the oven at 900° C. for 6 h.

In some embodiments, the perovskite-type oxygen carrier is prepared through steps of:
  subjecting red mud, manganese sand and calcium hydroxide together to crushing, drying and sieving to obtain a red mud powder, a manganese sand powder and a calcium oxide powder, wherein the red mud powder, the manganese sand powder and the calcium oxide powder each have a particle size of less than 75 μm, and the drying is performed at 105° C. for 4 h;
  mixing the red mud powder, the manganese sand powder, the calcium oxide powder and water to form a mixture; wherein the mixture has a moisture content of 10-15%, and a weight ratio of the red mud powder to the manganese sand powder to the calcium oxide powder is 36:38:26; and
  subjecting the mixture to pelletization, air-drying and oven-calcination to obtain the perovskite-type oxygen carrier.

In some embodiments, the step of subjecting the mixture to pelletization, air-drying and oven-calcination to obtain the perovskite-type oxygen carrier comprises:

pelletizing the mixture to form a pellet blank having a particle size of 0.5-1 mm;

air-drying the pellet blank at 20-30° C. for 24-48 h to obtain an air-dried pellet blank; and oven-calcining the air-dried pellet blank through a predetermined drying program to obtain the perovskite-type oxygen carrier;

wherein the predetermined drying program is performed through steps of:

heating an oven at a heating rate of 5° C./min to 350° C., and holding the oven at 350° C. for 2 h; and heating the oven at a heating rate of 5° C./min to 850° C., and holding the oven at 850° C. for 6 h.

In some embodiments, the sludge-ash oxygen carrier is prepared through steps of:

crushing an iron-rich sludge material followed by drying at 105° C. for 4 h to obtain a second iron-rich sludge particle;

subjecting the second iron-rich sludge particle to ashing and sieving to obtain a sludge ash powder with a particle size of less than 75 μm;

mixing the sludge ash powder with water to form a mixture; and subjecting the mixture to pelletization, air-drying and oven-calcination to obtain the sludge-ash oxygen carrier.

In some embodiments, the step of subjecting the mixture to pelletization, air-drying and oven-calcination to obtain the sludge-ash oxygen carrier comprises:

pelletizing the mixture to form a pellet blank having a particle size of 0.5-1 mm;

air-drying the pellet blank at 20-30° C. for 24-48 h to obtain an air-dried pellet blank; and oven-calcining the air-dried pellet blank through a predetermined drying program to obtain the sludge-ash oxygen carrier;

wherein the predetermined drying program is performed through steps of:

heating an oven at a heating rate of 5° C./min to 350° C., and holding the oven at 350° C. for 2 h; and heating the oven at a heating rate of 5° C./min to 850° C., and holding the oven at 850° C. for 6 h.

Compared to the prior art, the present disclosure has the following beneficial effects.

The chemical looping gasification method provided herein can effectively delay performance degradation of oxygen carriers and reduce operational costs. Specifically, the first iron-rich sludge sample is subjected to pressure filtration and crushing to produce the first iron-rich sludge particle with a moisture content of 40-50%. The chemical looping gasification reaction is performed on the iron-based oxygen carrier and the first iron-rich sludge particle in the fluidized bed reactor to obtain the sludge ash as the supplemental oxygen carrier. Thereby, the chemical looping gasification reaction is conducted with the supplemental oxygen carrier, the iron-based oxygen carrier and unreacted first iron-rich sludge particle. The method provided herein utilizes the catalytic and oxygen-carrying functions of iron oxides in the sludge ash to delay oxygen carrier performance degradation, reduce operational costs, and promote large-scale application of chemical looping technology. Meanwhile, the supplemental oxygen carriers are self-generated and renewed during the reaction process through the iron-rich sludge particle, featuring simple processing and low cost. Additionally, the disclosed method enables more efficient sludge utilization and improves resource recovery rates.

The additional features, objectives and advantages of the present disclosure will be further described in conjunction with the embodiments and accompanying drawings.

BRIEF DESCRIPTION OF THE DRAWINGS

In order to illustrate the technical solutions in the embodiments of the present disclosure or the prior art more clearly, the accompanying drawings needed in the description of the embodiments or prior art will be briefly described below. Obviously, presented in the accompanying drawings are only some embodiments of the present disclosure, and for those of ordinary skill in the art, other accompanying drawings can be obtained from the structures illustrated therein without making creative effort.

DETAILED DESCRIPTION OF EMBODIMENTS

The technical solutions in the embodiments of the present disclosure will be described clearly and completely below in conjunction with the accompanying drawings. It is obvious that the described embodiments are merely some embodiments of the present disclosure, instead of all embodiments. Based on the embodiments in the present disclosure, all other embodiments obtained by those of ordinary skill in the art without making creative effort shall fall within the scope of the present disclosure.

Sludge, as the primary solid waste generated in the wastewater treatment process, has a high moisture content and is primarily composed of organic matter. It also contains nitrogen (N), phosphorus (P), toxic pollutants, inorganic compounds, pathogens and other microbial contaminants. With the increase in population and economic activities, the production of municipal sludge has grown rapidly. Currently, the main methods for sludge treatment are thermochemical conversion techniques such as incineration and gasification, which not only yield valuable energy (such as thermal energy, combustible gases, bio-oil and biochar) but also produce a large amount of ash, primarily composed of elements such as silicon (Si), calcium (Ca), phosphorus (P), aluminum (Al), and iron (Fe).

In the chemical looping gasification process of sludge, the organic matter contained in the sludge is converted into syngas or other combustible gases, thereby achieving energy recovery and utilization. However, due to the effects of mechanical, thermal, and chemical stresses, the oxygen carrier tends to suffer from severe performance degradation phenomena such as attrition and elutriation, phase separation, agglomeration and sintering, which limit the large-scale commercial application of the chemical looping technology.

An embodiment of the present disclosure provides a chemical looping gasification method for iron-rich sludge, which can address the problem of excessive performance degradation of oxygen carriers during the existing chemical looping gasification process of sludge.

The technical solutions of the present disclosure will be described in further detail below with reference to the accompanying drawings.

Figure 1:
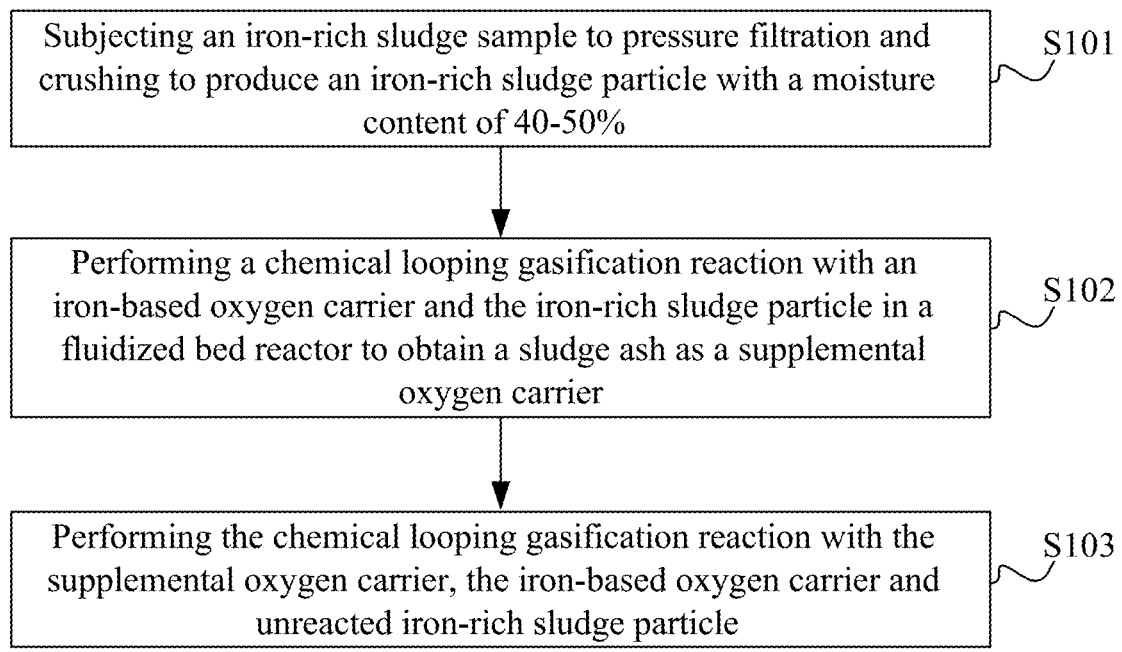
FIG. 1 is a flowchart of a chemical looping gasification method for iron-rich sludge according to an embodiment of the present disclosure.

FIG. 1 is a flowchart of a chemical looping gasification method for iron-rich sludge. Referring to FIG. 1, the method including the following steps.

(S101) A to-be-processed iron-rich sludge sample is subjected to pressure filtration and crushing to obtain an iron-rich sludge particle with a moisture content of 40-50%.

(S102) A chemical looping gasification reaction is performed on an iron-based oxygen carrier and the iron-rich sludge particle in a fluidized bed reactor to obtain a sludge ash as a supplemental oxygen carrier.

(S103) The chemical looping gasification reaction is performed between the supplemental oxygen carrier, the iron-based oxygen carrier and unreacted iron-rich sludge particle, respectively.

In this embodiment, during the pressure filtration and crushing treatment of the iron-rich sludge sample, the mechanical pressure filtration step is first performed to reduce the moisture content of the sludge to 40-50%. Subsequently, the filter-pressed iron-rich sludge is subjected to mechanical crushing and sieving, such that a particle size of the resulting iron-rich sludge particle is 0.5-1 mm, so as to obtain the aforementioned iron-rich sludge particle.

After the iron-rich sludge particle are prepared, the chemical looping gasification can be performed. Specifically, the chemical looping gasification is performed on the iron-based oxygen carrier and the iron-rich sludge particle in the fluidized bed reactor to obtain the sludge ash as the supplemental oxygen carrier.

Specifically, the ashing process of the sludge described above refers to the complete transformation of the initially added sludge into ash through sequential pyrolysis, gasification, and residual carbon combustion during each chemical looping gasification cycle. After the chemical looping gasification, the resulting sludge ash underwent shrinking-core collapse to form a sludge ash particle, which simultaneously deposited onto a surface of other solid particles, thereby accomplishing the self-growth process of the sludge ash particle.

In this embodiment, the fluidized bed reactor achieves switching between gasification and air reaction modes by alternating an intake gas atmosphere. A cyclone separator is provided at an outlet of the fluidized bed reactor to enable material classification and separation. Specifically, the cyclone separator facilitates replacement of the iron-based oxygen carrier by separating a portion of the oxygen carrier, thereby regulating a ratio of sludge to oxygen carrier during the gasification process to optimize the composition and quality of the resulting syngas.

After the supplemental oxygen carrier is generated, the chemical looping gasification reaction is carried out based on the supplemental oxygen carrier, the iron-based oxygen carrier and the unreacted iron-rich sludge particle.

In this embodiment, the iron-based oxygen carrier is selected from the group consisting of a copper-iron spinel oxygen carrier, a perovskite-type oxygen carrier, a sludge-ash oxygen carrier and a combination thereof.

A chemical formula of the copper-iron spinel oxygen carrier is $CuFe_2O_4$, and a chemical formula of the perovskite-type oxygen carrier is $CaMn_{0.5}Fe_{0.5}O_{3-\delta}$.

In an embodiment, after performing the chemical looping gasification reaction based on the supplemental oxygen carrier, the iron-based oxygen carrier, and the unreacted iron-rich sludge particle, an intake atmosphere of the fluidized bed reactor is switched to air, and the sludge ash is subjected to crushing, floatation and discharging.

The iron-based oxygen carrier and the supplemental oxygen carrier are regenerated to complete one cycle of chemical looping gasification.

Figure 2:
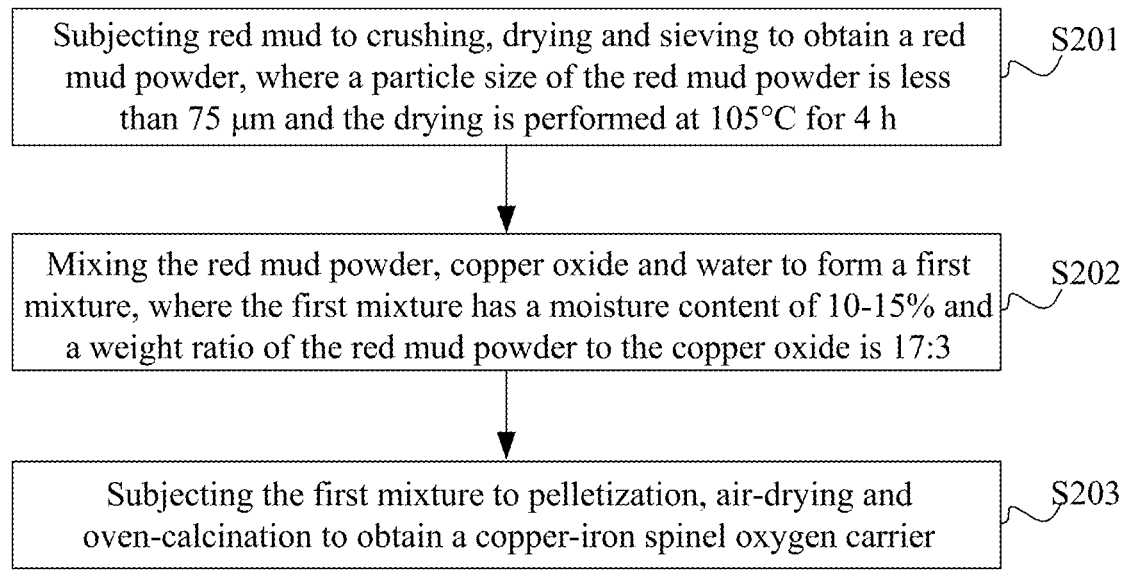
FIG. 2 is a flowchart of a method for preparing a copper-iron spinel oxygen carrier according to an embodiment of the present disclosure.

FIG. 2 is a flowchart of a method for preparing the copper-iron spinel oxygen carrier ($CuFe_2O_4$). Referring to FIG. 2, the copper-iron spinel oxygen carrier is prepared through the following steps.

(S201) Red mud is subjected to crushing, drying and sieving to obtain red mud powder, where a particle size of the red mud powder is less than 75 μm, and the drying is performed at 105° C. for 4 h.

(S202) The red mud powder, copper oxide and water are mixed to form a first mixture, where a moisture content of the first mixture is 10-15%, and a weight ratio of the red mud powder to the copper oxide is 17:3.

(S203) The first mixture is subjected to pelletization, air-drying and oven-calcination to obtain the copper-iron spinel oxygen carrier.

In this embodiment, the red mud is subjected to crushing, drying and sieving to obtain the red mud powder. In practical applications, the sieving is performed using a 200-mesh sieve to yield the red mud powder with the particle size of less than 75 μm. Then, the red mud powder is dried at 105° C. for 4 h until reaching a constant weight.

Then, the red mud powder, the copper oxide and the water are mixed. Specifically, the red mud powder and the copper oxide are mechanically mixed using a cantilevered electric mixer to stir for 3-6 h to ensure uniform mixing. During the stirring process, water is sprayed gradually while stirring until a moisture content of the resulting mixture reaches 10-15%.

In an embodiment, step S203 includes the following steps.

In an embodiment, the first mixture is subjected to pelletization to form a first pellet blank with a particle size of 0.5-1 mm. Specifically, the pelletization step is performed using an extrusion-spheronization method on an industrial scale.

In this embodiment, the extrusion-spheronization method is a commonly used granulation process for preparing solid particulate products. A basic principle of the extrusion-spheronization method is to extrude a raw material into defined shapes using an extruder, followed by spheronization of the extrudate into spherical granules using a spheronizer. Specifically, the first mixture is extruded through a screw mechanism in the extruder, which compresses and forces the material through a die to form continuous cylindrical strands. The resulting strands are then transferred to the spheronizer, where the rotating motion of a drum shapes the strands into spherical granules, thereby yielding the final particulate product.

The first pellet blank is subjected to air-drying at 20-30° C. for 24-48 h to yield a first air-dried pellet blank.

The first air-dried pellet blank is subjected to oven-calcination in an oven through a first predetermined drying program to obtain the copper-iron spinel oxygen carrier.

Specifically, the first predetermined drying program is performed through the following steps. The oven is heated at a heating rate of 5° C./min to 350° C. and held at 350° C. for 2 h, and further heated at a heating rate of 5° C./min to 900° C. and maintained at 900° C. for 6 h.

In this embodiment, the oven includes a muffle furnace.

Figure 3:
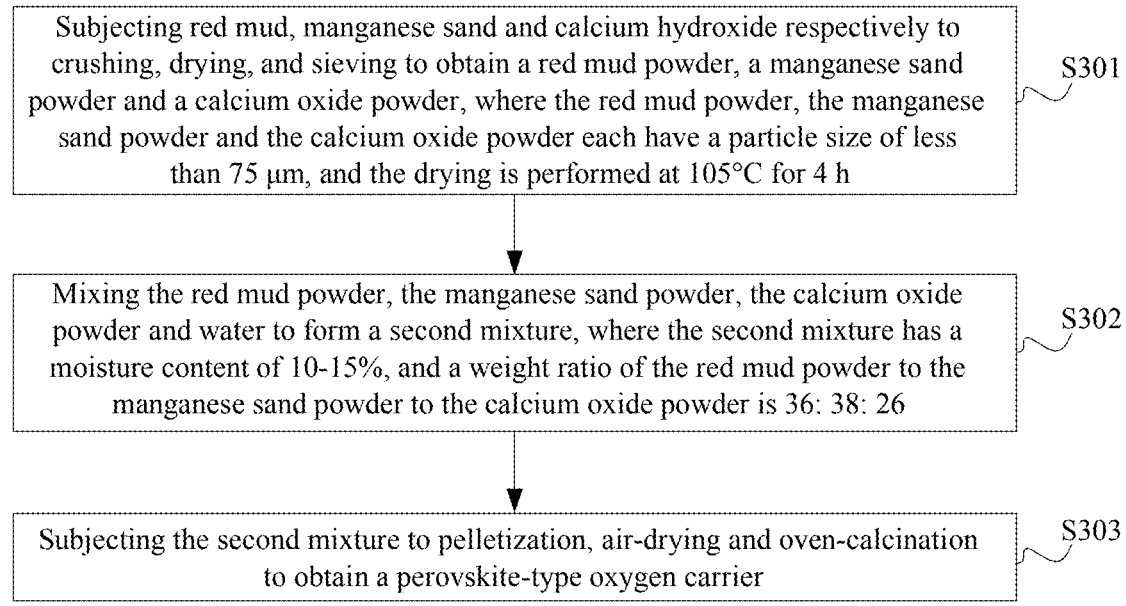
FIG. 3 is a flowchart of a method for preparing a perovskite-type oxygen carrier according to an embodiment of the present disclosure.

FIG. 3 is a flowchart of a method for preparing the perovskite-type oxygen carrier. Referring to FIG. 3, the perovskite-type oxygen carrier ($CaMn_{0.5}Fe_{0.5}O_{3-\delta}$) is prepared through the following steps.

(S301) Red mud, manganese sand and calcium hydroxide are respectively subjected to crushing, drying and sieving to obtain a red mud powder, a manganese sand powder and a calcium oxide powder. The red mud powder, the manganese sand powder and the calcium oxide powder each have a particle size of less than 75 µm. The drying is performed at 105° C. for 4 h.

(S302) The red mud powder, the manganese sand powder, the calcium oxide powder and water are mixed to form a second mixture, where a moisture content of the second mixture is 10-15%, and a weight ratio of the red mud powder to the manganese sand powder to the calcium oxide powder is 36:38:26.

(S303) The second mixture is subjected to pelletization, air-drying and oven-calcination to obtain the perovskite-type oxygen carrier.

In this embodiment, the red mud, the manganese sand and calcium hydroxide are respectively subjected to crushing, drying and sieving to obtain the red mud powder, the manganese sand powder and the calcium oxide powder. In practical applications, the sieving is performed using the 200-mesh sieve to yield the red mud powder, the manganese sand powder and the calcium oxide powder, each having a particle size of less than 75 µm. Then, the red mud powder, the manganese sand powder and the calcium oxide powder are dried at 105° C. for 4 h until reaching a constant weight.

Then, the red mud powder, the manganese sand powder and the calcium oxide powder are mixed with water. Specifically, the red mud powder, the manganese sand powder and the calcium oxide powder are mechanically mixed using the cantilevered electric mixer to stir for 3-6 h to ensure uniform mixing. During the stirring process, water is sprayed while stirring until a moisture content of the resulting mixture reaches 10-15%.

In an embodiment, step S303 includes the following steps.

In an embodiment, the second mixture is subjected to pelletization to form a second pellet blank with a particle size of 0.5-1 mm. Specifically, the pelletization step is performed using a disc granulation method on an industrial scale.

In this embodiment, the disc granulation method is a common granulation process used to convert powdery or granular raw materials into solid granules. It is widely applied in fields such as pharmaceuticals, chemicals and food processing. A basic principle of the disc granulation method involves using a rotating disc to promote tumbling, layering and granulating of the raw materials, thereby forming the desired granular product.

In the disc granulation method, the second mixture is first evenly sprayed onto a rotating disc. As the disc rotates, the second mixture are subjected to centrifugal and frictional forces to form solid granules. Meanwhile, the addition of an appropriate amount of binder or lubricant facilitates granule formation and enhances the mechanical strength of the resulting particles.

Then, the second pellet blank is subjected to air-drying at 20-30° C. for 24-48 h to obtain a second air-dried pellet blank.

Finally, the second air-dried pellet blank is subjected to oven-calcination in an oven through a second predetermined drying program to obtain the perovskite-type oxygen carrier.

Specifically, the second predetermined drying program is performed through the following steps. The oven is heated at a heating rate of 5° C./min to 350° C. and held at 350° C. for 2 h, and further heated at a heating rate of 5° C./min to 850° C. and maintained at 850° C. for 6 h.

In this embodiment, the oven includes the muffle furnace.

Figure 4:
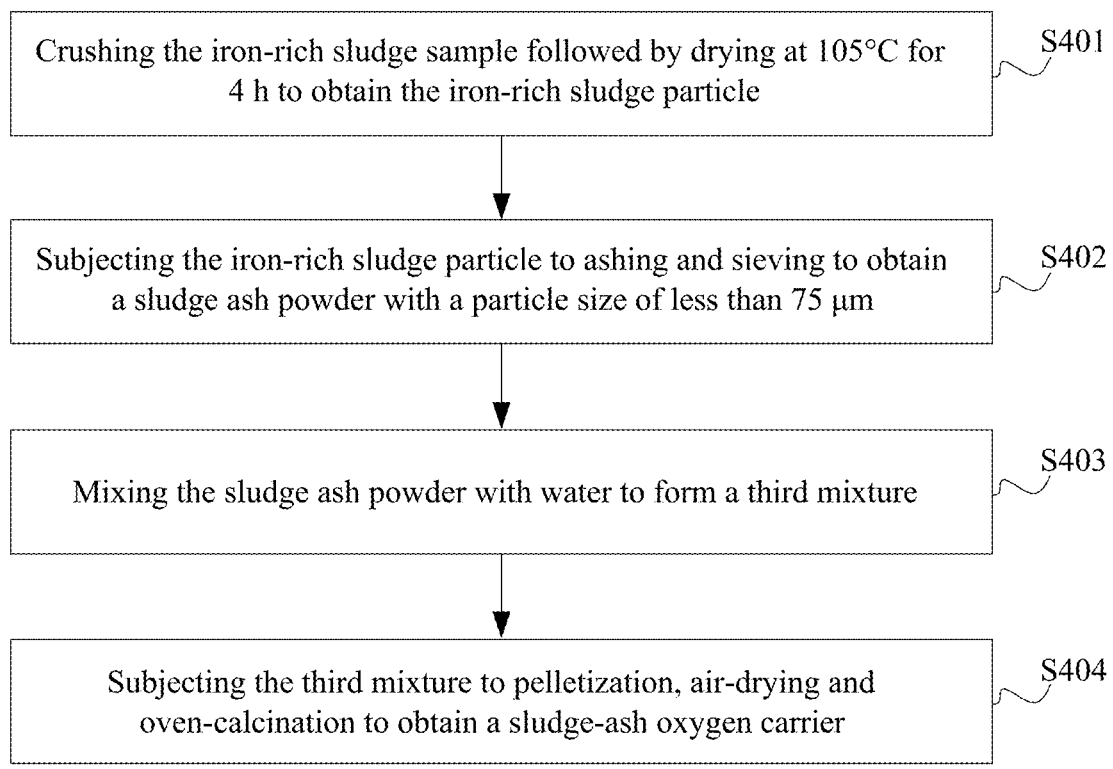
FIG. 4 is a flowchart of a method for preparing a sludge-ash oxygen carrier according to an embodiment of the present disclosure.

FIG. 4 is a flowchart of a method for preparing the sludge-ash oxygen carrier. Referring to FIG. 4, the sludge-ash oxygen carrier is prepared through the following steps.

(S401) The iron-rich sludge sample is subjected to crushing and drying to obtain the iron-rich sludge particle, where the drying is performed at 105° C. for 4 h.

(S402) The iron-rich sludge particle is sequentially subjected to ashing and sieving to obtain a sludge ash powder with a particle size of less than 75 µm.

(S403) The sludge ash powder is mixed with water to obtain a third mixture.

(S404) The third mixture is sequentially subjected to pelletization, air-drying and oven-calcination to obtain the sludge-ash oxygen carrier.

In this embodiment, the iron-rich sludge is sequentially subjected to crushing and drying to obtain the iron-rich sludge particle, and the iron-rich sludge particle are further sequentially subjected to ashing and sieving to obtain the sludge ash powder.

In practical applications, during the ashing treatment of the iron-rich sludge powder, the iron-rich sludge powder is uniformly spread in a crucible and then placed into the muffle furnace at room temperature. Under natural ventilation conditions with the furnace door left with a 15 mm gap, the muffle furnace is heated to 500° C. within 30 min and maintained at 500° C. for 30 min, and further heated to 815° C. and held at 815° C. for 2.5 h to complete the ashing process of the iron-rich sludge particle. In addition, the 200-mesh sieve is used for the sieving treatment of the iron-rich sludge particle.

In an embodiment, step S404 includes the following steps.

First, the third mixture is subjected to pelletization to form a third pellet blank with a particle size of 0.5-1 mm. In this embodiment, the third mixture is pelletized using the disc granulation method.

Then, the third pellet blank is subjected to air-drying at 20-30° C. for 24-48 h to obtain a third air-dried pellet blank.

Finally, the third air-dried pellet blank is subjected to oven-calcination in an oven through a third predetermined drying program to obtain the sludge-ash oxygen carrier.

Specifically, the third predetermined drying program is performed through the following steps. The oven is heated at a heating rate of 5° C./min to 350° C. and held at 350° C.

for 2 h, and further heated at a heating rate of 5° C./min to 850° C. and maintained at 850° C. for 6 h.

In this embodiment, the oven includes the muffle furnace.

The chemical looping gasification method provided herein will be described in further detail below with reference to the embodiments.

It should be noted that, the sludge used in the following embodiments is collected from the same site. Analysis results of the sludge fuel are shown in Table 1.

TABLE 1

Analysis of sludge fuel

| Sample | Proximate analysis (wt. %) | | | | Elemental analysis (wt. %) | | | | |
|---|---|---|---|---|---|---|---|---|---|
| | Mar | Var | FCar | Aar | Cd | Hd | Nd | Sd | Od* |
| Sludge | 79.82 | 10.03 | 1.33 | 8.82 | 22.82 | 3.52 | 3.43 | 2.30 | 24.22 |

The oxygen (O) content is calculated by a subtraction method.

The iron-rich sludge ash used in the following embodiments is analyzed by X-ray fluorescence spectroscopy (XRF), the main chemical components and their corresponding contents are listed in Table 2.

TABLE 2

Main chemical components in iron-rich sludge ash

| Chemical component | $SiO_2$ | $Fe_2O_3$ | $P_2O_5$ | CaO | $SO_3$ | $Al_2O_3$ | MgO | $K_2O$ | $TiO_2$ | MnO | ZnO |
|---|---|---|---|---|---|---|---|---|---|---|---|
| Content (wt/%) | 29.516 | 20.096 | 16.726 | 12.664 | 7.246 | 6.379 | 4.000 | 1.698 | 1.001 | 0.262 | 0.249 |

The red mud used in the following embodiments is collected from the same site. After the XRF testing, the main chemical components and their corresponding contents are shown in Table 3.

TABLE 3

Main chemical components in red mud

| Chemical component | $Na_2O$ | MgO | $Al_2O_3$ | $SiO_2$ | CaO | $TiO_2$ | $Fe_2O_3$ | $K_2O$ |
|---|---|---|---|---|---|---|---|---|
| Content (wt/%) | 6.1407 | 0.1642 | 18.7015 | 20.1579 | 2.8823 | 4.0777 | 41.9228 | 0.1094 |

Example 1

Provided herein was a method for evaluating the performance degradation of a copper-iron spinel oxygen carrier in the absence of sludge ash, including the following steps.

Firstly, the copper-iron spinel oxygen carrier ($CuFe_2O_4$) was prepared using the method described in the above embodiment. In this embodiment, 425 g of red mud powder, 75 g of copper oxide powder and 55 g of water were used during the mixing process.

Then, 30 g of copper-iron spinel oxygen carrier ($CuFe_2O_4$) was subjected to 30 cycles of redox regeneration in a thermogravimetric analyzer (TGA), The temperature and gas control program were as follows.

(1) Heating Process 30 g of the copper-iron spinel oxygen carrier ($CuFe_2O_4$) was heated to 800° C. at a heating rate of 25° C./min under a nitrogen ($N_2$) atmosphere at a flow rate of 50 ml/min.

(2) Reduction Process

The carrier gas was switched to 100 ml/min of 5% $H_2$/95% $N_2$ at 800° C. and maintained at 800° C. for 30 min to achieve complete reduction of the oxygen carrier.

(3) Purging Process

The carrier gas was switched to 50 ml/min $N_2$ to purge the reducing gas ($H_2$) from the reaction system.

(4) Oxidation Process

The carrier gas was switched to 100 ml/min air and maintained for 15 min to regenerate the oxygen carrier.

In this embodiment, the heating step was only required in the first cycle, while the remaining cycles repeated the same procedure to complete 30 cycles of redox regeneration, thereby assessing the performance degradation of the copper-iron spinel oxygen carrier ($CuFe_2O_4$) in the absence of sludge ash.

Example 2

Provided herein was a method for evaluating the performance degradation of a copper-iron spinel oxygen carrier in the presence of sludge ash, including the following steps.

Firstly, the copper-iron spinel oxygen carrier ($CuFe_2O_4$) was prepared using the same method as described in Example 1.

Then, 10 g of copper-iron spinel oxygen carrier ($CuFe_2O_4$) was subjected to 30 cycles of chemical looping gasification of iron-rich wet sludge in a small-scale fluidized bed reactor, including the following steps.

The iron-rich sludge particle prepared in the above embodiment were loaded into a feed hopper. A screw feeder was calibrated to achieve a continuous feed rate over 3 min corresponding to an O/C molar ratio of 1:2.75.

The copper-iron spinel oxygen carrier was introduced into the fluidized bed reactor through a feed port. Nitrogen was used as the carrier gas at a flow rate of 6 L/min. A pressure of an outlet of the fluidized bed reactor was monitored to verify gas-tightness of the fluidized bed reactor and fluidization state. The fluidized bed reactor was heated to 800° C. at a heating rate of 10° C./min and held at 800° C. for 30 min to activate the copper-iron spinel oxygen carrier.

The screw feeder was activated to initiate the chemical looping gasification of the sludge. As the iron-rich sludge particle entered the fluidized bed reactor, gas-phase products were collected via a gas collection bag at the outlet for gas chromatography analysis. The collection was stopped once the sludge feeding was halted.

The carrier gas was switched to air at 6 L/min for 10 min to regenerate the oxygen carrier, combust the residual carbon produced during the gasification process, and improve the crystallinity of the resulting ash.

The sludge feeding and carrier gas switching operations were repeated to complete 30 cycles of chemical looping gasification of the copper-iron spinel oxygen carrier in the presence of iron-rich sludge ash.

After completing all cycles, the fluidized bed reactor was left to cool to room temperature. The copper-iron spinel oxygen carrier was collected and subjected to characterization testing to assess the performance degradation of the copper-iron spinel oxygen carrier oxygen carrier ($CuFe_2O_4$) in the presence of sludge ash (with continuous addition of sludge during the cycling process).

Example 3

Provided herein was a method for evaluating the performance degradation of a perovskite-type oxygen carrier ($CaMn_{0.5}Fe_{0.5}O_{3-\delta}$) in the absence of sludge ash, including the following steps.

Firstly, the perovskite-type oxygen carrier ($CaMn_{0.5}Fe_{0.5}O_{3-\delta}$) was prepared using the method described in the above embodiment. In this embodiment, 180 g of red mud powder, 190 g of manganese sand powder, 130 g of calcium oxide powder and 55 g of water were used during the mixing process.

Then, 30 g of perovskite-type oxygen carrier ($CaMn_{0.5}Fe_{0.5}O_{3-\delta}$) was subjected to 30 cycles of redox regeneration in a thermogravimetric analyzer (TGA). The temperature and gas control program were as follows.
(1) Heating Process 30 g of perovskite-type oxygen carrier ($CaMn_{0.5}Fe_{0.5}O_{3-\delta}$) was heated to 800° C. at a heating rate of 25° C./min under a nitrogen ($N_2$) atmosphere at a flow rate of 50 ml/min.
(2) Reduction Process The carrier gas was switched to 100 ml/min of 5% $H_2$/95% $N_2$ at 800° C. and maintained at 800° C. for 30 min to achieve complete reduction of the oxygen carrier.
(3) Purging Process The carrier gas was switched to 50 ml/min $N_2$ to purge the reducing gas ($H_2$) from the reaction system.
(4) Oxidation Process The carrier gas was switched to 100 ml/min air and maintained for 15 min to regenerate the oxygen carrier.

In this embodiment, the heating step was only required in the first cycle, while the remaining cycles repeated the same procedure to complete 30 cycles of redox regeneration, thereby evaluating the performance degradation of the perovskite-type oxygen carrier ($CaMn_{0.5}Fe_{0.5}O_{3-\delta}$) in the absence of sludge ash.

Example 4

Provided herein was a method for evaluating the performance degradation of a perovskite-type oxygen carrier ($CaMn_{0.5}Fe_{0.5}O_{3-\delta}$) in the presence of sludge ash, including the following steps.

Firstly, the perovskite-type oxygen carrier ($CaMn_{0.5}Fe_{0.5}O_{3-\delta}$) was prepared using the same method as described in Example 3.

Then, 10 g of perovskite-type oxygen carrier ($CaMn_{0.5}Fe_{0.5}O_{3-\delta}$) was subjected to 30 cycles of chemical looping gasification of iron-rich wet sludge in a small-scale fluidized bed reactor, including the following steps.

The iron-rich sludge particle prepared in the above embodiment were loaded into a feed hopper. A screw feeder was calibrated to achieve a continuous feed rate over 3 min corresponding to an O/C molar ratio of 1:2.75.

The perovskite-type oxygen carrier was fed into the fluidized bed reactor through a feed port. Nitrogen was used as the carrier gas at a flow rate of 6 L/min. A pressure of an outlet of the fluidized bed reactor was monitored to verify gas-tightness of the fluidized bed reactor and fluidization state. The fluidized bed reactor was heated to 800° C. at a heating rate of 10° C./min and maintained at 800° C. for 30 min to activate the perovskite-type oxygen carrier.

The screw feeder was activated to initiate the chemical looping gasification of the sludge. As the iron-rich sludge particle entered the fluidized bed reactor, gas-phase products were collected via a gas collection bag at the outlet for gas chromatography analysis. The collection was stopped once the sludge feeding was halted.

The carrier gas was switched to air at 6 L/min for 10 min to regenerate the oxygen carrier, combust the residual carbon produced during the gasification process, and improve the crystallinity of the resulting ash.

The sludge feeding and carrier gas switching operations were repeated to complete 30 cycles of chemical looping gasification of the sludge.

After completing all the cycles, the fluidized bed reactor was left to cool to room temperature. The perovskite-type oxygen carrier was collected and subjected to characterization testing to determine the performance degradation of the perovskite-type oxygen carrier ($CaMn_{0.5}Fe_{0.5}O_{3-\delta}$) in the presence of sludge ash (with continuous addition of sludge during the cycling process).

Example 5

Provided herein was a chemical looping gasification method for iron-rich sludge, including the following steps.

First, the sludge-ash oxygen carrier was prepared using the method described in the above embodiments. Specifically, an iron-rich sludge was subjected to pressure filtration to reduce its moisture content to 30-50% to obtain a filter-pressed sludge. Then, the filter-pressed sludge was crushed and dried at 105° C. for 4 h to obtain a dried iron-rich sludge particle.

The dried iron-rich sludge particle was evenly spread in a crucible and placed in a muffle furnace at room temperature. Under natural ventilation conditions with a 15 mm gap left in the furnace door, the muffle furnace was heated to 500° C. within 30 min and held at 500° C. for 30 min, and further heated to 815° C. and calcined at 815° C. for 2.5 h to obtain the iron-rich sludge ash. The temperature was allowed to cool naturally to room temperature, after which the iron-rich sludge ash was mechanically crushed using a jaw crusher and then sieved to obtain iron-rich sludge ash powder with a particle size of less than 75 μm.

500 g of iron-rich sludge ash powder was mechanically stirred using a cantilevered mixer, during which 55 g of water was gradually sprayed to obtain a mixture with a moisture content of approximately 10%.

The mixture was formed into a granule using an industrial-scale disc granulator to obtain a pellet blank with a particle size of 0.1-1 mm.

The pellet blank was dried in a shaded area at 25° C. for 24 h to obtain a dried pellet blank. A two-stage heating program was performed in the muffle furnace. The muffle furnace was heated to 350° C. at a heating rate of 5° C./min and maintained at 350° C. for 2 h, then further heated to 850°

C. at a heating rate of 5° C./min and held for 6 h to obtain the sludge-ash oxygen carrier.

Then, 10 g of sludge-ash oxygen carrier was subjected to 30 cycles of chemical looping gasification of iron-rich wet sludge in a small-scale fluidized bed reactor, including the following steps.

The iron-rich sludge ash powder prepared above were loaded into a feed hopper. A screw feeder was calibrated to achieve a continuous feed rate over 3 min corresponding to an O/C molar ratio of 1:2.75.

The sludge-ash oxygen carrier was added into a fluidized bed reactor through a feed inlet. Nitrogen was used as the carrier gas at a flow rate of 6 L/min. A pressure of an outlet of the fluidized bed reactor was monitored to verify the gas-tightness of the fluidized bed reactor and fluidization state. The fluidized bed reactor was heated to 800° C. at a heating rate of 10° C./min and held at 800° C. for 30 min to activate the sludge-ash oxygen carrier.

The screw feeder was activated to initiate the chemical looping gasification of the sludge. As the iron-rich sludge particle entered the fluidized bed reactor, gas-phase product was collected via a gas collection bag at the outlet for gas chromatography analysis. The collection was stopped once the sludge feeding was halted.

The carrier gas was then switched to air at 6 L/min for 10 min to regenerate the sludge-ash oxygen carrier, combust the residual carbon produced during the gasification process, and improve the crystallinity of the resulting ash.

The sludge feeding and carrier gas switching operations were repeated to complete 30 redox cycles of chemical looping gasification of the sludge.

Phase Analysis

To compare the chemical compositions of the copper-iron spinel oxygen carrier ($CuFe_2O_4$), the perovskite-type oxygen carrier ($CaMn_{0.5}Fe_{0.5}O_{3-\delta}$) and the sludge-ash oxygen carrier, X-ray diffraction (XRD) test was performed. The XRD test results of the copper-iron spinel oxygen carrier ($CuFe_2O_4$), the perovskite-type oxygen carrier ($CaMn_{0.5}Fe_{0.5}O_{3-\delta}$) and the sludge-ash oxygen carrier were shown in FIG. 5.

Figure 5:
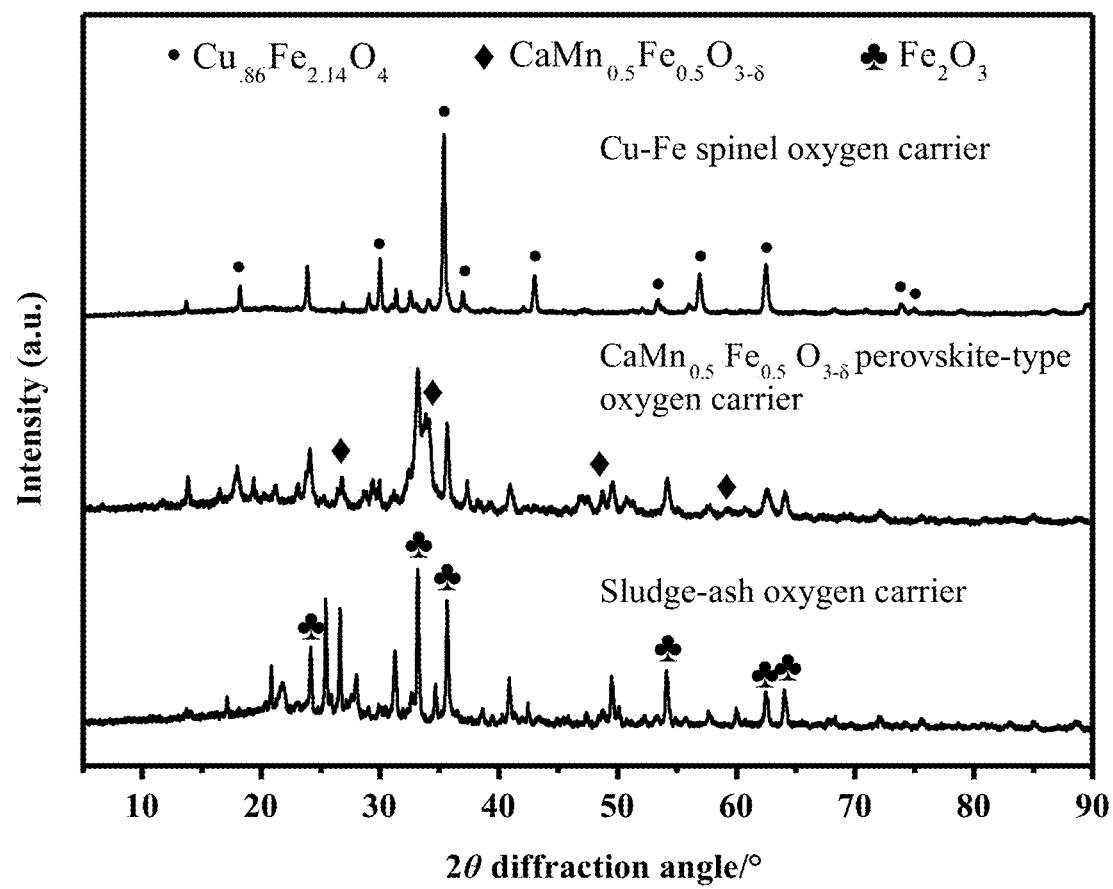
FIG. 5 schematically shows an X-ray diffraction (XRD) test result of iron-based oxygen carrier according to an embodiment of the present disclosure.

As shown in FIG. 5 and Table 3, prior to calcination, the red mud mainly contained $Fe_2O_3$, $SiO_2$ and $Al_2O_3$. After calcination, the main component of the copper-iron spinel oxygen carrier ($CuFe_2O_4$) was identified as $Cu_{0.86}Fe_{2.14}O_4$. In the perovskite-type oxygen carrier ($CaMn_{0.5}Fe_{0.5}O_{3-\delta}$), $CaMn_{0.5}Fe_{0.5}O_{3-\delta}$ was detected as the main component, accompanied by a residual amount of $Fe_2O_3$ that did not participate in the perovskite formation. Due to the substantial $SiO_2$ in the sludge ash, the sludge-ash oxygen carrier primarily consisted of $Fe_2O_3$. The $SiO_2$ reacted with $Al_2O_3$ and $Al(OH)_3$ to form aluminosilicates, effectively preventing the formation of iron-aluminate compound and preserving the overall reactivity of the oxygen carriers. These results confirmed the successful calcination of the three iron-based oxygen carriers. In the present disclosure, the iron-rich sludge ash particle underwent self-growth and self-renewal to function as auxiliary oxygen carriers under conditions associated with the use of the aforementioned iron-based oxygen carriers.

Gas Product Analysis

The oxygen carriers obtained in Examples 1, 3 and 5 were respectively subjected to 30 redox cycles of chemical looping gasification in the small-scale fluidized bed reactor, and the resulting gas-phase products were respectively collected and analyzed using a gas chromatograph to determine the syngas composition. The variations in syngas composition over multiple chemical looping gasification cycles corresponding to Examples 1, 3, and 5 are respectively illustrated in FIGS. 6, 7, and 8.

Figure 6:
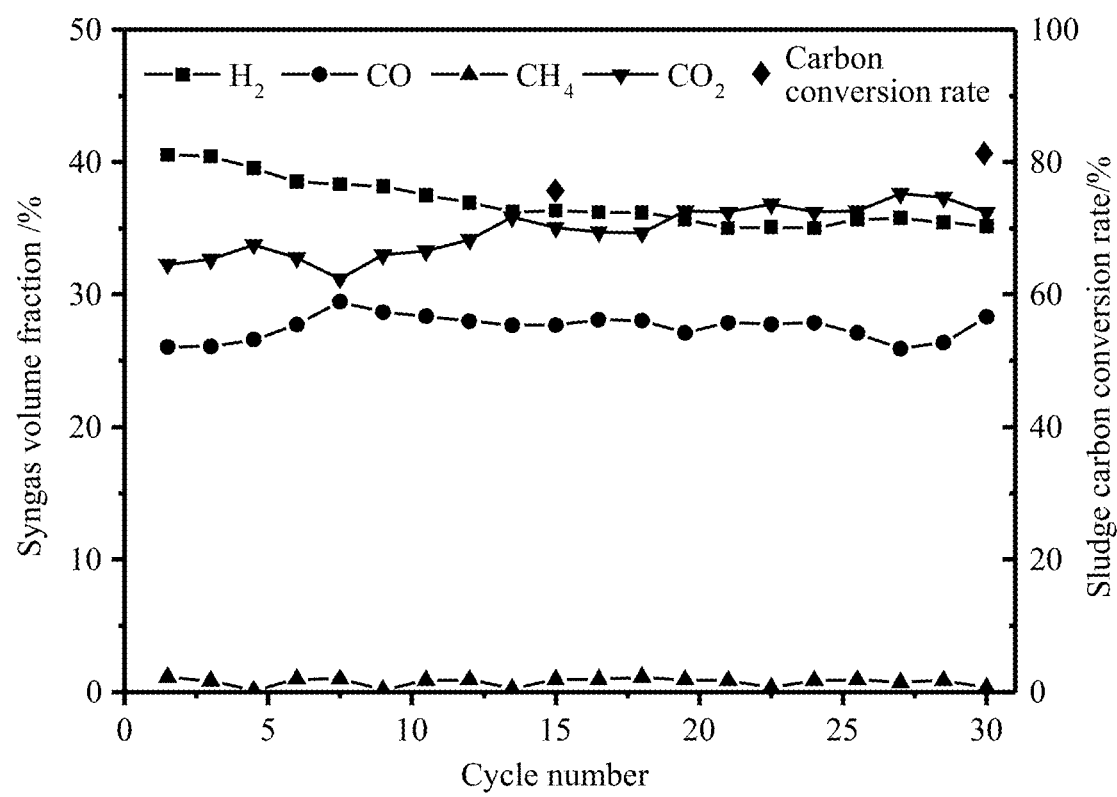
FIG. 6 schematically shows a syngas composition variation over multiple chemical looping gasification cycles using the copper-iron spinel oxygen carrier according to an embodiment of the present disclosure.
Figure 7:
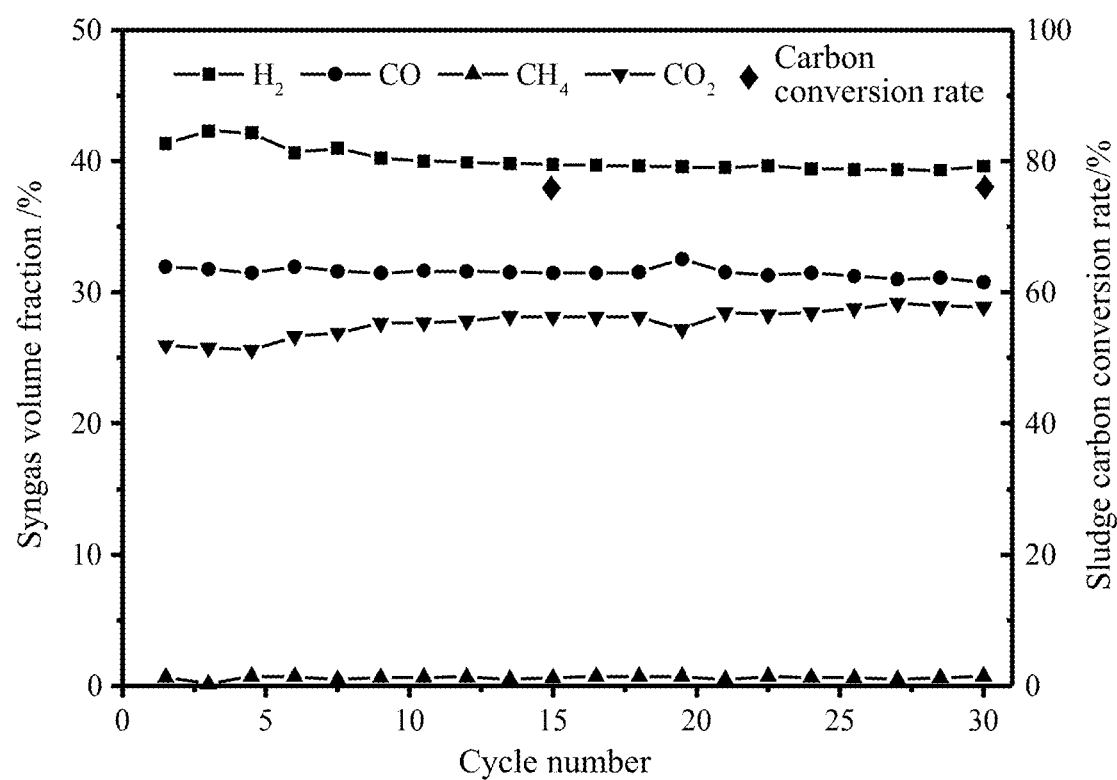
FIG. 7 schematically shows a syngas composition variation over multiple chemical looping gasification cycles using the perovskite-type oxygen carrier according to an embodiment of the present disclosure.
Figure 8:
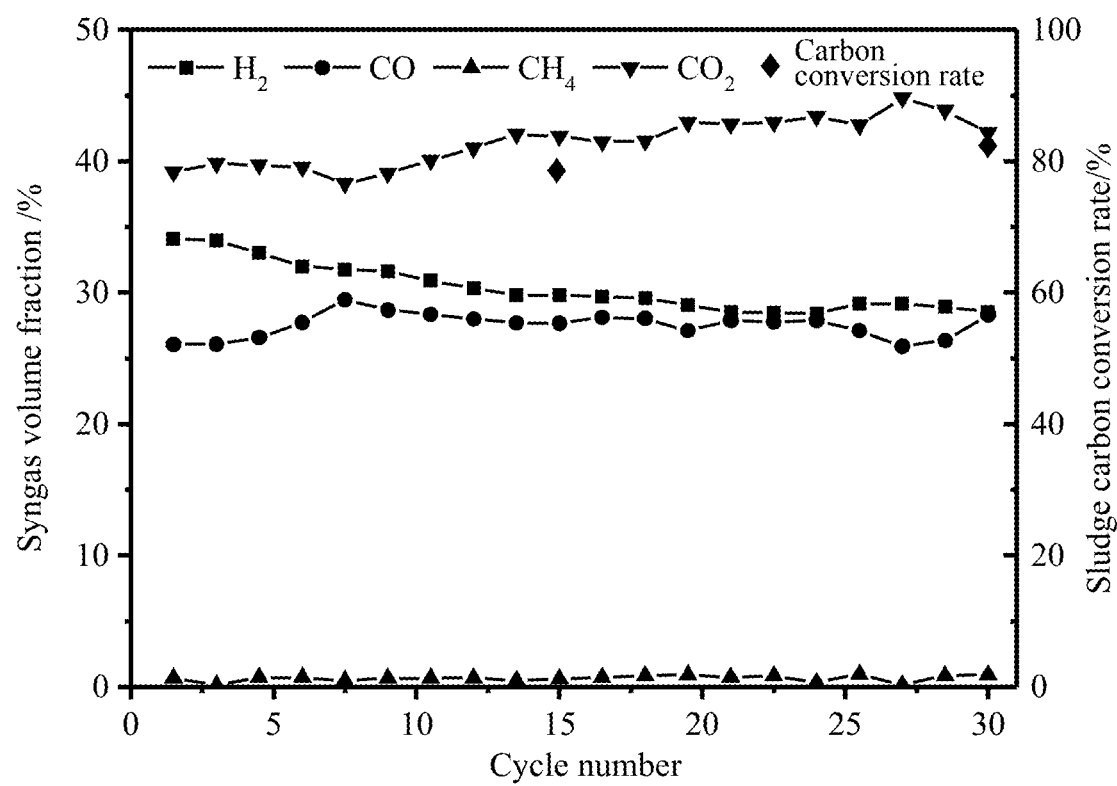
FIG. 8 schematically shows a syngas composition variation over multiple chemical looping gasification cycles using the sludge-ash oxygen carrier according to an embodiment of the present disclosure.
Figure 9A:
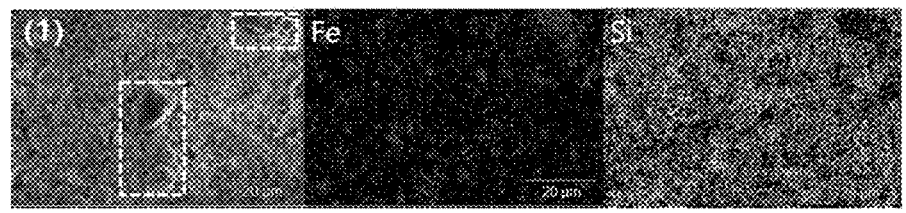
FIGS. 9A-9E show scanning electron microscopy with energy-dispersive X-ray spectroscopy (SEM-EDS) images of oxygen carrier after multiple chemical looping gasification cycles in Examples 1-5 of the present disclosure.
Figure 9B:
Figure 9C:
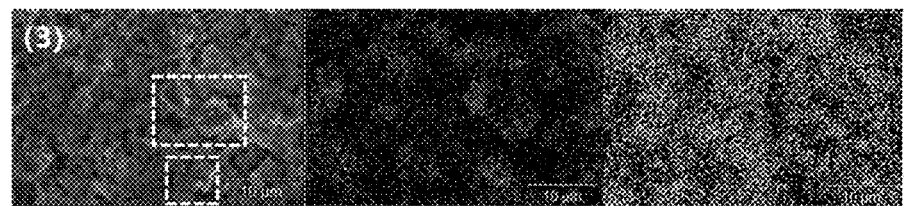
Figure 9D:
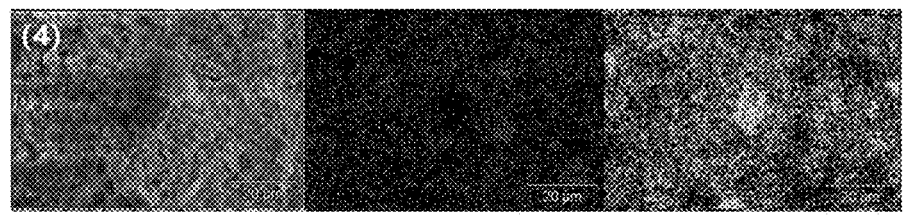
Figure 9E:
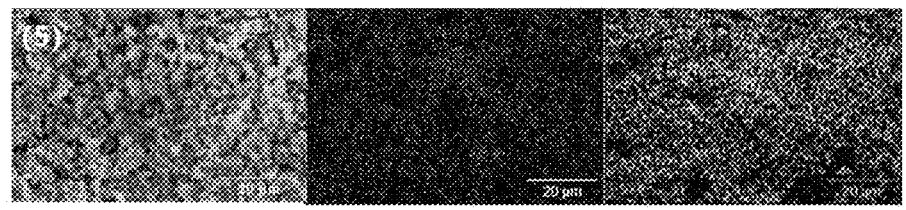

The variations in the syngas composition during the cycling process reflected the self-growth and self-renewal behavior of the sludge ash particle into the oxygen carrier. As shown in FIGS. 6-8, as the number of redox cycles increased, the content of combustible gas (e.g., $H_2$) decreased, while the carbon dioxide content increased. This observation indicated that during the cycling process, the progressively accumulated sludge ash underwent self-growth and self-renewal as the oxygen carrier, and released lattice oxygen during the gasification, which reduced syngas quality while enhancing sludge gasification efficiency, resulting in a 2.57-6.21% increase in the carbon conversion rate.

As shown in FIG. 7, when the perovskite-type oxygen carrier ($CaMn_{0.5}Fe_{0.5}O_{3-\delta}$) was employed, the syngas composition remained relatively stable. For example, after 20 redox cycles, the hydrogen content still reached 39.62%, which was attributed to the structural stability of the perovskite phase. As shown in FIG. 8, when the gasification experiment was conducted using the sludge-ash oxygen carrier, the continuous accumulation of the sludge-ash oxygen carrier resulted in significant fluctuations in the composition of the produced syngas.

Solid Product Analysis

In this embodiment, the oxygen carriers that underwent redox cycles in the thermogravimetric analyzer and chemical looping gasification cycles in the fluidized bed reactor were subjected to characterization by scanning electron microscopy with energy-dispersive X-ray spectroscopy (SEM-EDS). The analysis was performed to elucidate the microstructural evolution mechanisms of iron-based oxygen carrier performance variation in the presence of the sludge ash. The SEM-EDS characterization results were shown in FIGS. 9A-9E.

FIGS. 9A-9E showed the SEM-EDS characterization results for Examples 1-5. Under alternating atmosphere conditions in the thermogravimetric analyzer, continuous oxygen release and uptake cycles caused the oxygen carrier to develop distinct phase separation phenomena, as marked by the outlined areas in FIGS. 9A and 9C. Iron phase enrichment occurred on the surface of the oxygen carrier particle, forming isolated elemental islands, while the migration of iron phases exposed the supporting framework of the oxygen carriers, resulting in significant performance degradation. In contrast, in the fluidized bed reactor, the continuous introduction of sludge during each operational cycle provided in situ replenishment of sludge-ash oxygen carriers. Under sustained fluidization, the intimate contact between the sludge ash and oxygen carriers induced competitive surface interactions, where the iron phases from the sludge ash particles in situ suppressed lattice oxygen release from the carrier surface. This interaction mechanism simultaneously delayed iron enrichment and phase segregation phenomena, while the combined oxygen-transfer and catalytic functionalities of the sludge ash effectively mitigated the performance degradation rate of the oxygen carriers across successive redox cycles.

It should be noted that, as used herein, the terms "comprise" and variations thereof are intended to be open-ended and mean "including but not limited to". The term "based on" refers to "at least partially based on". The term "an embodiment" refers to "at least one embodiment"; "another embodiment" refers to "at least one additional embodiment"; and "some embodiments" refers to "at least some embodiments". Unless otherwise explicitly stated, the terms "a", "an" and "the" are intended to mean "one or more" and are not to be considered as limiting.

It should be understood that the method steps described in the embodiments of the present disclosure may be performed in different sequences and/or executed concurrently. In addition, certain illustrated steps may be omitted and/or additional steps may be included, without departing from the scope of the present disclosure.

As used herein, the term "embodiment" refers to a specific feature, structure, or characteristic described in conjunction with at least one embodiment of the present disclosure. The use of such terms throughout the present disclosure does not necessarily refer to the same embodiment, and embodiments are not mutually exclusive unless explicitly stated. Rather, various described embodiments may be combined or implemented together. For ease of reference and clarity, related or similar elements among different embodiments may be cross-referenced. In particular, embodiments directed to devices, apparatuses, or systems may be described in a simplified manner where their technical content is substantially analogous to that of method embodiments, and reference may be made to corresponding portions of the method embodiments as appropriate.

Described embodiments are merely illustrative, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A chemical looping gasification method for iron-rich sludge, comprising:
    subjecting a to-be-processed iron-rich sludge sample to pressure filtration and crushing to produce a first iron-rich sludge particle with a moisture content of 40-50% and a diameter of 0.5-1 mm;
    performing a chemical looping gasification of the first iron-rich sludge particle with an iron-based oxygen carrier and in a fluidized bed reactor to obtain a sludge ash as a supplemental oxygen carrier;
    performing the chemical looping gasification with the supplemental oxygen carrier, the iron-based oxygen carrier and unreacted first iron-rich sludge particle; and
    switching an intake atmosphere of the fluidized bed reactor to air, subjecting the sludge ash to crushing, floatation and discharging, and regenerating the iron-based oxygen carrier and the supplemental oxygen carrier to complete one cycle of chemical looping gasification.

2. The method of claim 1, wherein the iron-based oxygen carrier is selected from the group consisting of a copper-iron spinel oxygen carrier, a perovskite oxygen carrier, a sludge-ash oxygen carrier and a combination thereof.

3. The method of claim 2, wherein a chemical formula of the copper-iron spinel oxygen carrier is $CuFe_2O_4$, and a chemical formula of the perovskite oxygen carrier is $CaMn_{0.5}Fe_{0.5}O_{3-\delta}$.

4. The method of claim 2, wherein the copper-iron spinel oxygen carrier is prepared through steps of:
    subjecting red mud to crushing, drying and sieving to obtain a red mud powder; wherein a particle size of the red mud powder is less than 75 µm, and the drying is performed at 105° C. for 4 h;
    mixing the red mud powder, copper oxide and water to form a mixture; wherein the mixture has a moisture content of 10-15%, and a weight ratio of the red mud powder to the copper oxide is 17:3; and
    subjecting the mixture to pelletization, air-drying and oven-calcination to obtain the copper-iron spinel oxygen carrier.

5. The method of claim 4, wherein the step of subjecting the mixture to pelletization, air-drying and oven-calcination to obtain the copper-iron spinel oxygen carrier comprises:
    pelletizing the mixture to form a pellet blank with a particle size of 0.5-1 mm;
    air-drying the pellet blank at 20-30° C. for 24-48 h to obtain an air-dried pellet blank; and
    oven-calcining the air-dried pellet blank through a predetermined drying program to obtain the copper-iron spinel oxygen carrier;
    wherein the predetermined drying program is performed through steps of:
    heating an oven at a heating rate of 5° C./min to 350° C. and holding the oven at 350° C. for 2 h; and
    heating the oven at a heating rate of 5° C./min to 900° C., and holding the oven at 900° C. for 6 h.

6. The method of claim 2, wherein the perovskite oxygen carrier is prepared through steps of:
    subjecting red mud, manganese sand and calcium hydroxide together to crushing, drying and sieving to obtain a red mud powder, a manganese sand powder and a calcium oxide powder, wherein the red mud powder, the manganese sand powder and the calcium oxide powder each have a particle size of less than 75 µm, and the drying is performed at 105° C. for 4 h;
    mixing the red mud powder, the manganese sand powder, the calcium oxide powder and water to form a mixture; wherein the mixture has a moisture content of 10-15%, and a weight ratio of the red mud powder to the manganese sand powder to the calcium oxide powder is 36:38:26; and
    subjecting the mixture to pelletization, air-drying and oven-calcination to obtain the perovskite-type oxygen carrier.

7. The method of claim 6, wherein the step of subjecting the mixture to pelletization, air-drying and oven-calcination to obtain the perovskite-type oxygen carrier comprises:
    pelletizing the mixture to form a pellet blank having a particle size of 0.5-1 mm;
    air-drying the pellet blank at 20-30° C. for 24-48 h to obtain an air-dried pellet blank; and
    oven-calcining the air-dried pellet blank through a predetermined drying program to obtain the perovskite-type oxygen carrier;
    wherein the predetermined drying program is performed through steps of:
    heating an oven at a heating rate of 5° C./min to 350° C., and holding the oven at 350° C. for 2 h; and
    heating the oven at a heating rate of 5° C./min to 850° C., and holding the oven at 850° C. for 6 h.

8. The method of claim 2, wherein the sludge-ash oxygen carrier is prepared through steps of:
    crushing an iron-rich sludge material followed by drying at 105° C. for 4 h to obtain a second iron-rich sludge particle;
    subjecting the second iron-rich sludge particle to ashing and sieving to obtain a sludge ash powder with a particle size of less than 75 µm;
    mixing the sludge ash powder with water to form a mixture; and subjecting the mixture to pelletization, air-drying and oven-calcination to obtain the sludge-ash oxygen carrier.

9. The method of claim 8, wherein the step of subjecting the mixture to pelletization, air-drying and oven-calcination to obtain the sludge-ash oxygen carrier comprises:
pelletizing the mixture to form a pellet blank having a particle size of 0.5-1 mm;
air-drying the pellet blank at 20-30° C. for 24-48 h to obtain an air-dried pellet blank; and
oven-calcining the air-dried pellet blank through a predetermined drying program to obtain the sludge-ash oxygen carrier;
wherein the predetermined drying program is performed through steps of:
heating an oven at a heating rate of 5° C./min to 350° C., and holding the oven at 350° C. for 2 h; and
heating the oven at a heating rate of 5° C./min to 850° C., and holding the oven at 850° C. for 6 h.

\* \* \* \* \*